US012598083B2

(12) United States Patent
Hoffman et al.

(10) Patent No.: US 12,598,083 B2
(45) Date of Patent: Apr. 7, 2026

(54) ELECTRONIC DEVICE TRACKING OR VERIFICATION

(71) Applicant: Raytheon Company, Arlington, VA (US)

(72) Inventors: Colby K. Hoffman, Fairview, TX (US); Nick Angelo, Mckinney, TX (US); Cheryl Reid, Mckinney, TX (US); Steven J. Austin, Sr., Aubrey, TX (US); Trevor B. Hird, Austin, TX (US); Michelle Moholt, Gunter, TX (US)

(73) Assignee: Raytheon Company, Arlington, VA (US)

( * ) Notice: Subject to any disclaimer, the term of this patent is extended or adjusted under 35 U.S.C. 154(b) by 178 days.

(21) Appl. No.: 18/355,957

(22) Filed: Jul. 20, 2023

(65) Prior Publication Data

US 2025/0030564 A1 Jan. 23, 2025

(51) Int. Cl.
H04L 9/32 (2006.01)
H04L 9/00 (2022.01)
H04L 9/08 (2006.01)

(52) U.S. Cl.
CPC .......... H04L 9/3278 (2013.01); H04L 9/0861 (2013.01); H04L 9/3231 (2013.01); H04L 9/3236 (2013.01); H04L 9/50 (2022.05)

(58) Field of Classification Search
CPC ... H04L 9/3278; H04L 9/0861; H04L 9/3231; H04L 9/3236; H04L 9/50; H04L 9/3239
See application file for complete search history.

(56) References Cited

U.S. PATENT DOCUMENTS

| | | | |
|---|---|---|---|
| 2013/0198838 A1* | 8/2013 | Schmidt | H04L 63/126 726/22 |
| 2022/0247174 A1* | 8/2022 | Miller | H02J 3/0073 |
| 2023/0179424 A1* | 6/2023 | McNamee | H04L 9/3239 713/193 |

OTHER PUBLICATIONS

Islam, Md Nazmul, "Enabling IC Traceability via Blockchain Pegged to Embedded PUF", ACM Transactions on Design Automation of Electronic Systems, vol. 24, No. 3, Article 36, (Apr. 2019), 23 pgs.
Kulkarni, Akshay, "A Blockchain Technology Approach for the Security and Trust of the IC Supply Chain", 2019 IEEE National Aerospace and Electronics Conference (NAECON), Dayton, OH, USA, (2019), 249-252.
Xiaolin, Xu, "Electronics Supply Chain Integrity Enabled by Blockchain", ACM Transact Des Autom Electron Syst. 2019;24(3):10. 1145 3315571, (Feb. 20, 2019), 34 pgs.

* cited by examiner

*Primary Examiner* — Hany S. Gadalla

(74) *Attorney, Agent, or Firm* — Schwegman Lundberg & Woessner, P.A.

(57) ABSTRACT

Systems, devices, and methods for device or bio-organism authenticity verification are provided. A method can include identifying (i) respective challenges indicating respective stimuli and (ii) a root node hash value, generating the respective stimuli, recording respective responses to the respective electrical stimuli, hashing the respective responses resulting in respective hashed responses, hashing a combination of hashed responses of the respective hashed responses resulting in a key, and comparing the key to the root node hash value.

20 Claims, 9 Drawing Sheets

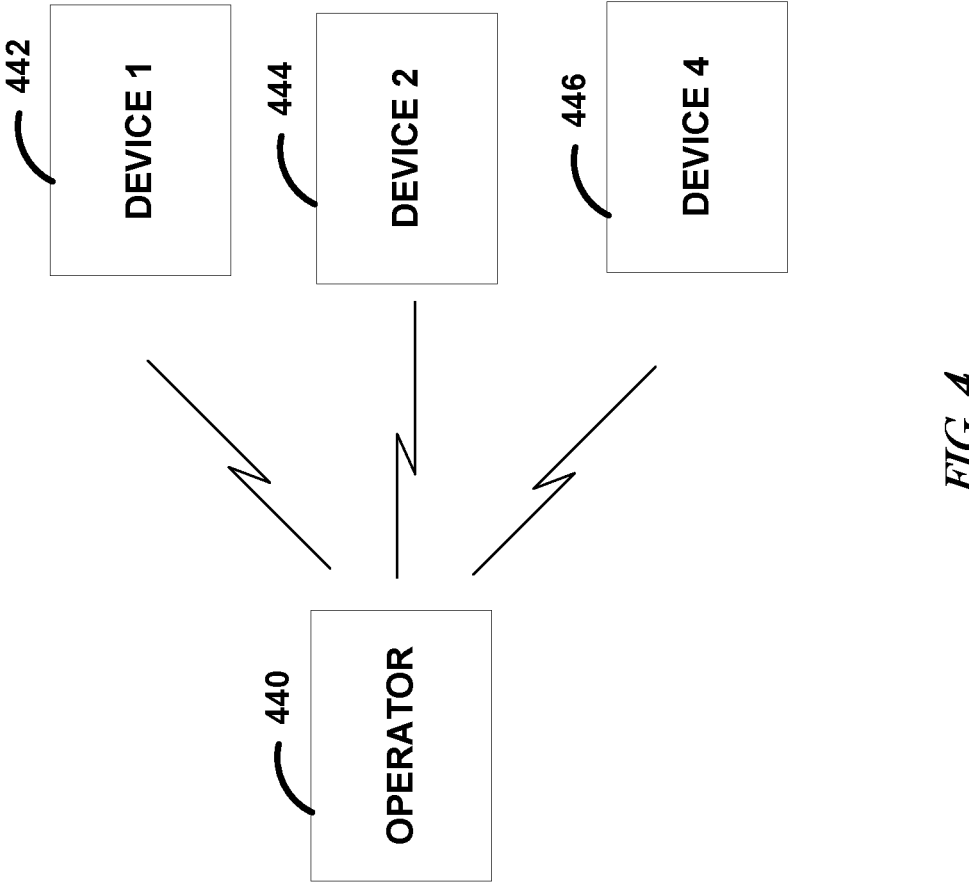
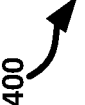
*FIG. 4*

334

BLOCK HEADER 552

HASH OF PREVIOUS BLOCK HEADER

TIMESTAMP

NONCE

HASH OF BLOCK DATA

BLOCK DATA (CHALLENGE, HASH OF RESPONSE)

BLOCK N+1

554

BLOCK HEADER 550

HASH OF PREVIOUS BLOCK HEADER — 558

TIMESTAMP — 560

NONCE — 562

HASH OF BLOCK DATA — 564

BLOCK DATA (CHALLENGE, HASH OF RESPONSE) — 556

BLOCK N

500

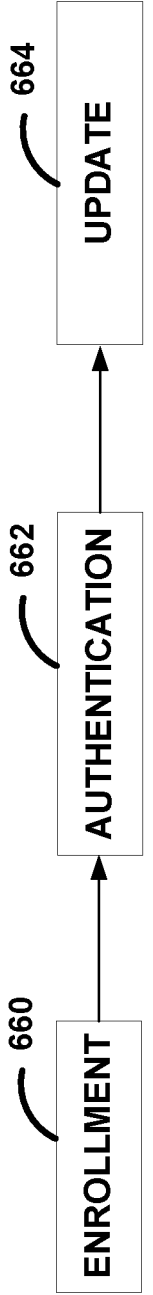
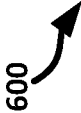
*FIG. 6*

800

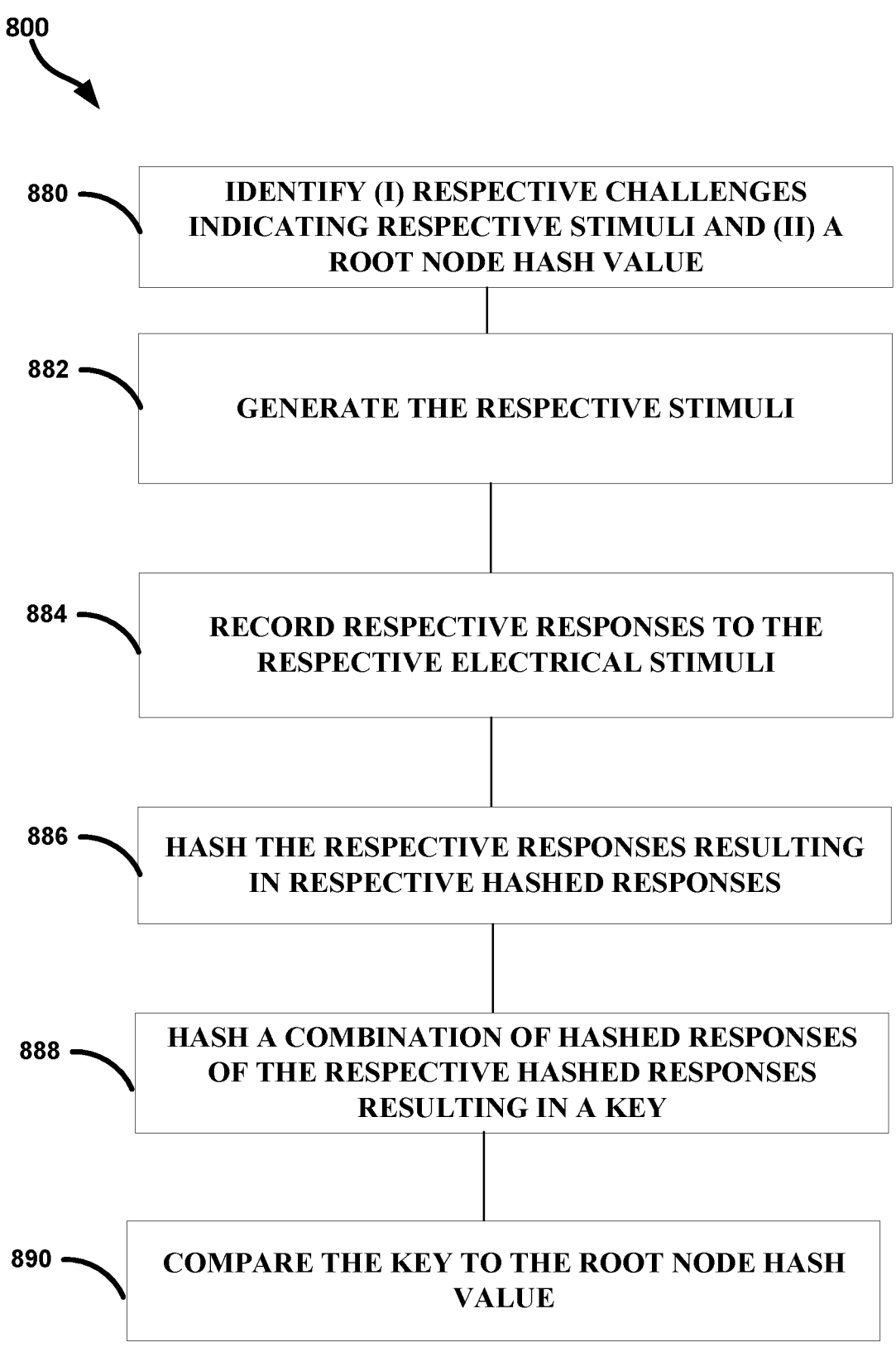

880 — IDENTIFY (I) RESPECTIVE CHALLENGES INDICATING RESPECTIVE STIMULI AND (II) A ROOT NODE HASH VALUE

882 — GENERATE THE RESPECTIVE STIMULI

884 — RECORD RESPECTIVE RESPONSES TO THE RESPECTIVE ELECTRICAL STIMULI

886 — HASH THE RESPECTIVE RESPONSES RESULTING IN RESPECTIVE HASHED RESPONSES

888 — HASH A COMBINATION OF HASHED RESPONSES OF THE RESPECTIVE HASHED RESPONSES RESULTING IN A KEY

890 — COMPARE THE KEY TO THE ROOT NODE HASH VALUE

*FIG. 8*

ELECTRONIC DEVICE TRACKING OR VERIFICATION

TECHNICAL FIELD

Embodiments discussed herein generally relate to processes for secure identification, authentication, tracking, control, security, or tamper detection of electronic devices. Embodiments can be used in supply chains or other areas of an electronic device life cycle.

BACKGROUND

Prior electronic device tracking includes auditing of assets. In such auditing, an external mark, typically including some globally unique indicia (e.g., a number or other series of characters, a quick response (QR) code, or the like), is applied to an external, easily accessible portion of the electronic device. A database indexing the device relative to the globally unique indicia is then accessed to determine a history of the device. These auditing systems are easily fooled, as the globally unique indicia can be removed, placed on another device, copied and placed on another electronic device, or the like. This makes these auditing systems insecure and inaccurate for many applications and settings.

There is also a popular method of embedding a hard coded identifier, like deoxyribonucleic acid (DNA), that can be read and verified by the user. An issue with such a technique is that it is easy to clone or simply generate a new bogus identifier. In some instances, the identifier is implemented in the metal layers of the device and the identifier is fixed. Some identifiers are implemented as one time programmable fuses that are set during wafer testing or device testing. Once set the identifier is always present and readable (therefore cloneable).

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

FIG. 4 illustrates, by way of example, a diagram of an embodiment of a system for command and control.

FIG. 6 illustrates, by way of example, a flow diagram of an embodiment of a technique for securely performing system upgrades.

FIG. 8 illustrates, by way of example, a diagram of an embodiment of a method for securing a supply chain of a component, assembly, system, or the like that includes strong PUFs.

DETAILED DESCRIPTION

Figure 1:
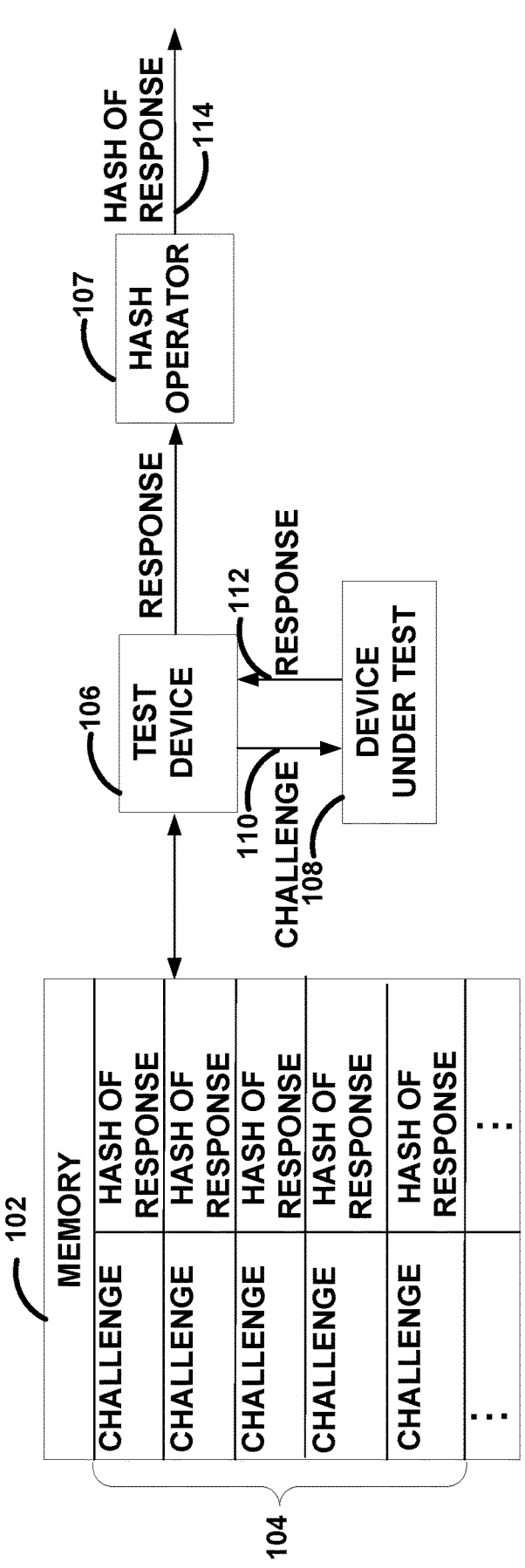
FIG. 1 illustrates, by way of example, a diagram of an embodiment of system for generating a hash of a response for a device under test (DUT).

Embodiments discussed herein generally relate to processes for secure identification, authentication, tracking, control, security, or tamper detection of electronic devices. Embodiments can be applied in multiple portions of the life cycle of these devices. Device "fingerprints" from prior life cycle process steps can be authenticated at a later stage, such as to verify device authenticity and attestation or otherwise reaffirm that the device is the same device as expected. Unique digital signatures can testify to process and control steps as well as to provide accountability, audit, or forensics.

Embodiments can combine strong physical unclonable function (PUF) technology with a protocol to create a unified approach to provide secure identification, authentication, tracking, tamper detection, or control of electronic devices. Embodiments can combine specific cryptographic protocols for integrity, and signing to create cryptographic keys (e.g., in the form of hashes of responses), ledgers, and other instruments that are securely and irrefutably bound to specific individual electronic devices. Embodiments can provide means to generate keys and certificates to bind. Embodiments can provide a specified process and protocols for life-cycle operations to facilitate a consistent process for tracking and use of electronic devices from manufacture to decommission of the electronic devices.

No standard approach currently exists for secure identification, authentication, tracking, and control of trusted electronic processing devices within supply chains or other portion of the life cycle of these electronic processing devices. Further, no known approach exists for secure field deployment of documents and objects such as new baselines of software and firmware that are securely bound to those specific individual electronic devices or systems using those devices.

PUF technology provides a hardware-grounded cryptographic primitive. Using PUF, one can derive a cryptographic entropy and keys from an electronic device, such as by using statistical processing. One can use a large number of independent PUF measurements whose values are derived from real-valued device behavioral characteristics that vary due to natural manufacturing process as input to a cryptographic entropy or key generation technique.

Electronic devices are increasingly unclonable, since they are fabricated to produce higher performance at increased frequencies with smaller geometries and at lower voltages. This makes it increasingly difficult to produce devices that are acceptably "identical." When enough measurements of a large number of independent parameters are taken, at sufficient precision, a problem of producing a second copy of device that produces the same measurements becomes increasingly intractable.

PUFs can be generally characterized as being either weak or strong PUFs. A weak PUF has a fixed limited number (typically one) of challenges per PUF instance. The weak PUF can be designed to restrict access or observability of responses such as to provide a more secure weak PUF. A strong PUF, in contrast, is typified by a more complex challenge-response behavior derived from a complex physical structure of the PUF. Typically, many physical components are involved in the generation of a response, and there is a very large number of possible challenges that can be applied to the strong PUF. PUF helper data, such as raw underlying physically observed phenomena, does not correspond to an idealized deterministic output without statistical manipulation. Furthermore, nondeterministic influences including environmental noise, supply voltages, temperature, or the like can be compensated for in order to produce statistically invariant and reproducible values. The pairing of a strong PUF challenge to the associated result is referred to as a challenge response pair (CRP). Strong PUFs have a nearly exponentially large CRP value space.

The security of strong PUFs does not rely on the security of the challenge-response interface, while a weak PUF does rely on the security of the challenge-response interface. The strong PUFs cannot be attacked by a full read-out of CRPs even if an adversary possesses the PUF for a long time.

In general, strong PUFs can be used for creating fingerprints of individual electronic devices, can appropriately be used to irrefutably authenticate that a device is the same as that device as originally manufactured, and can be used to irrefutably determine that no other device can be associated with a set of CRPs obtained in the validation process. Data and metadata can be securely bound to a specific device based on the use of a strong PUF. A PUF combined with a classification function can be used to create a "fingerprint" recorded, serialized, and tracked through a database for supply chain. A strong PUF can be used to help provide a complete supply chain and whole life use process that explains how to efficiently and effectively combine the use of PUFs for identification, authentication, and tracking with a set of procedural cryptographic techniques and tools to create a complete "cradle to grave" process that provides the additive capabilities for a) transfer of control from performer-to-performer or supplier-to-customer, b) sequential registration, time stamping, signing, recording, logging, and record transfer of transactions and transaction logs or ledgers for process performers, process actions events, locations, etc.

Embodiments can include an electronic device fingerprint approach and process for secure identification, authentication, tracking, tamper detection, and control of electronic processing devices within supply chains or moreover during the whole life cycle use for these devices. Embodiments can use an arbitrary number of CRPs derived from individual electronic processing devices. The CRPs can be created at any powered life cycle operation/step and then used by the step owner to provide proof-of-service-step performance and authenticity to down-stream consumers or users. CRPs can include a strong PUF derived cryptographic values that are bound to the corresponding electronic device. The CRPs can be used to bind information and objects to those individual electronic devices in a secure and irrefutable manner.

A CRP from a prior life cycle process step can be authenticated at a follow-on stage where device authenticity is screened or otherwise reaffirmed by verifying the response of the challenge defined by the CRP. CRPs and signatures can be used to testify to authenticity at each process step. Digital signatures of the CRPs can be used to testify to process and control steps as well as to provide accountability, audit, tamper detection, and other forensics. Cryptographic certificates with CRP signatures can be used to bind values and objects to specific devices in an unforgeable and irrefutable manner. Appendable transcripts or ledgers can be securely bound by CRPs to the devices to provide auditable chain-of-control logs as well as records of prior device/system history, etc.

Embodiments can use cryptographic techniques and instruments, such as a Merkle tree, a block chain ledger, or a combination thereof, to record process transactions which are securely bound to the specific devices or assemblies and systems that incorporate those electronic devices. Embodiments provide processes for transfer of control procedures securely bound to those specific devices or assemblies and systems that incorporate those devices FIG. 1 illustrates, by way of example, a diagram of an embodiment of system 100 for generating a hash of a response 114 for a device under test (DUT) 108. The hash of the response 114 can be used as a cryptographic verification. The DUT is an electronic device or a component of the electronic device. The system 100 includes a challenge and response pairs 104. A challenge 110 for the DUT 108 can be selected or retrieved, such as randomly or strategically, by the test device 106. The challenge 110 is an electrical stimulus to be applied to the DUT 108 so as to elicit a response 112. The response 112 is a characteristic reaction of the DUT 108 and only the DUT 108. The response 112 is globally unique to the DUT 108 due to manufacturing variation. The challenge 110 is the PUF and the response 112 is the output of the PUF. The response 112 is hashed, by a hash operator 107, to generate the hash of the response 114. The hash of the response 114 can be stored in the memory 102 and associated with the challenge 110. The hash of the response 114 is unique to the DUT because the response 112 is unique to the DUT 108. The hash of the response 114 can be used to verify the identity of the DUT 108, determine whether the DUT 108 has been tampered with, determine whether the DUT 108 has degraded is otherwise defective or damaged, update the DUT 108, encrypt or decrypt a communication, or the like. The hash of the response 114 can be chained together in a tree of hashes of the responses associated with the DUT 108 so as to verify that the components of the DUT 108 are as expected.

The hash of the response 114 can be stored, along with the corresponding challenge 110, a device identification (a number uniquely identifying the electronic device), one or more characteristics of the electronic device (e.g., a make of the electronic device, a model of the electronic device, a date or year manufactured, software or firmware installed on the electronic device), as an enrollment record in the memory 102.

The challenges 110 comprise define electrical stimulus inputs that are provided to the DUT 108. The electrical stimulus can include a singular or pattern of voltages, currents, powers, or frequencies (e.g., a range of voltages, currents, power, and/or frequencies) provided to the DUT 108 and a location for the electrical stimulus. The response 112 of the DUT 108 can include a power consumption, a voltage, current, power or frequency (e.g., a range of voltages, currents, power, or frequencies), temperature, signal timing, a signal to noise ratio (SNR), a radio frequency (RF) pattern, such as an RF pattern of a signal created by the component or an RF interference pattern of the component. The response 112 can be measured by monitoring a voltage and/or current, sensing a temperature, detecting an RF radiation pattern, and/or using the measured data to calculate a parameter, such as SNR, power, propagation delay, or other parameter. In some embodiments, the challenge or response can include an electrical and/or frequency based signal leakage.

In one or more embodiments, circuit probes can be set up to provide the challenge 110 to the test device 106 external to the DUT 108 being monitored, and the test device 106 can determine the response based on the probes. In other embodiments the response 112 can be measured internally by the DUT 108 itself. The signals to be monitored can include inputs and/or outputs from one or more traces, pads, vias, or other component nodes, and/or signals from one or more sensors, such as an ohm meter, a current meter, a voltage meter, a temperature probe, a microphone, chemical sensor, magnetometer, accelerometer, gyroscope, capacitance sensor, position sensor, optical sensor, pressure sensor, force sensor, proximity sensor, or other sensor.

Using the system 100, the enrollment database can be populated with enrollment records that contain challenges 110 and associated strong PUF responses 112 for the DUT 108. The enrollment record can be generated at one or more stages of an electronic device's life cycle. Examples of life cycle stages include DUT 108 fabrication, packaging, electrical testing, supplier receiving the DUT 108, consumer receiving the DUT 108, operation of the DUT 108, among others.

The hash operator 107 implements a keyed or an unkeyed cryptographic hash function. Example hash functions that can be implemented by the hash operator include BLAKE, SHA, RIPE, MD, or the like.

Figure 2:
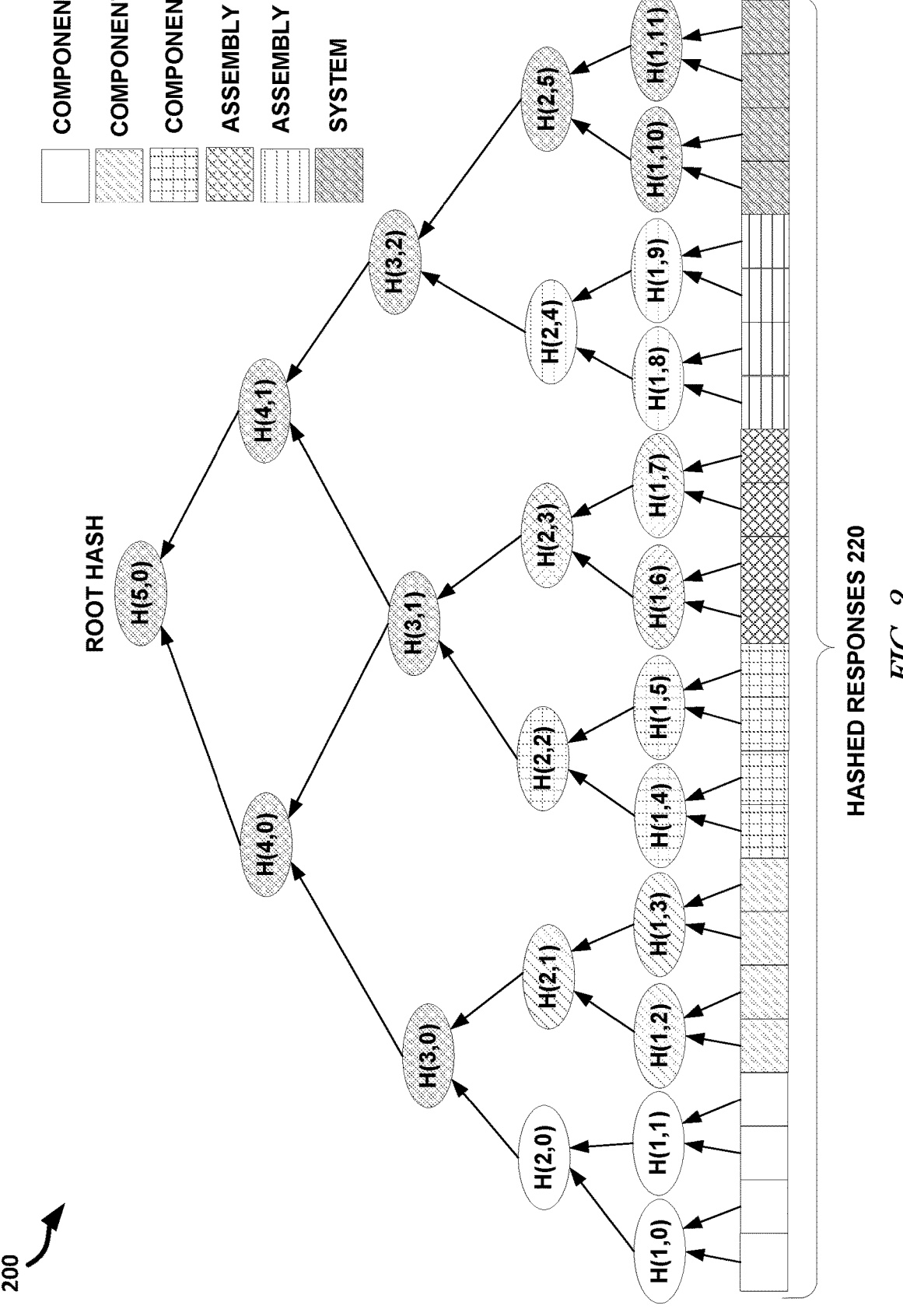
FIG. 2 illustrates, by way of example, a diagram of embodiment of a verification tree.

FIG. 2 illustrates, by way of example, a diagram of embodiment of a verification tree 200. The DUT 108 can be broken down into components, assemblies, and a system. A system is a combination assemblies or components. An assembly is a combination of components. Components are individual electric or electronic components such as resistors, transistors, capacitors, diodes, inductors, amplifiers, switches, multiplexers, logic gates, dies, or the like. An assembly can include a package of components, a circuit board with multiple components, or the like. The system is the final product that is delivered. One or more the components, assemblies, or system as a whole, can be tested, such as by using the system 100. Example systems and assemblies include field programmable gate arrays (FPGAs), central processing units (CPUs), graphics processing units (GPUs), systems on chips (SoCs), microcontroller unit (MCU), or the like. The responses of the components, assemblies, system, or a combination thereof, can be individually hashed and organized into the verification tree 200. The verification tree 200 is thus a collection of hashed responses 220 or challenge and hashed response pairs. The hashed responses 220 are thus sometimes used in a same manner as a public key or an initialization vector.

The verification tree 200 illustrated in FIG. 2 includes hashed responses 220 from three components, two assemblies, and a system. The three components and two assemblies are organized into the system. In the verification tree 200 the leaves are formed by the hashed responses 220 from each of the components, assemblies, and system. That is, the hashed responses 220 from the components, assemblies, and the system are all on the same level of the verification tree 200 in the example of FIG. 2. Each of the nodes of the verification tree 200 is a hash of multiple hash values. In the verification tree 200, the nodes are the ellipses with H(level, index) indicia.

Consider a use case in which a user wishes to verify that the component, assembly, or system is the precise one that was indicated as being delivered. During manufacturing, assembly, or distribution, an operator can record the challenge response pairs 104 for the component (see FIG. 1). The operator can provide the challenges 110 for the component that were performed during manufacturing to a future user. Then the user can retrieve the challenges for the component, such as by accessing the enrollment database or accessing a local record of the challenges. The user can then apply the challenges to the component and hash the corresponding responses. The hashed responses can be combined by further hashing the hashed responses to ultimately determine $H(2,0)$. If $H(2,0)$ matches the same value in the enrolment record, it is guaranteed that the component is indeed the same component that was installed during manufacturing. If any hash value in the verification tree 200 does not match what was recorded in the enrollment record, a component, assembly, or system is defective, fraudulent, or otherwise not operating in the manner expected. The verification tree 200 can thus be used to verify individual components, the system, the assembly, individually or in combination.

Figure 3:
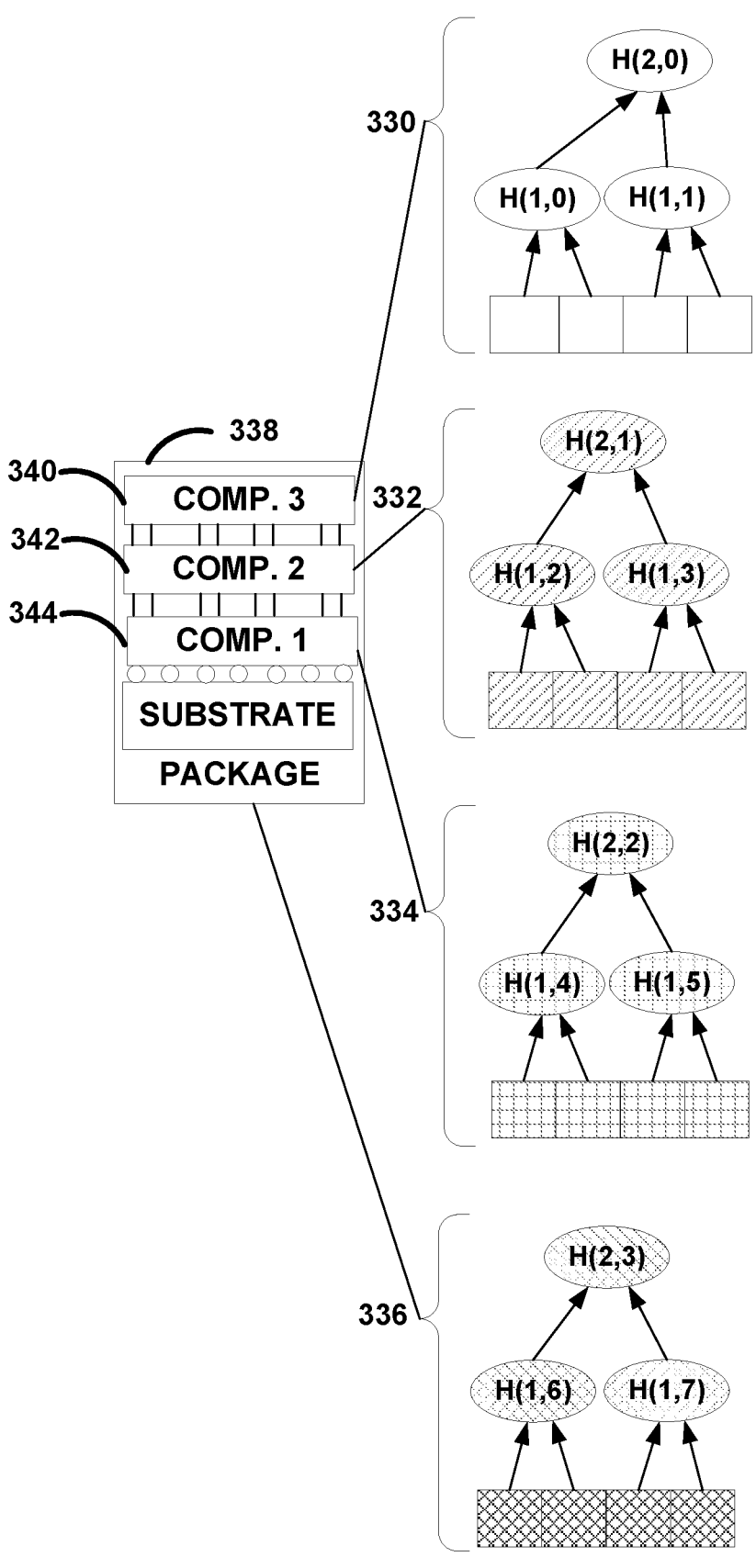
FIG. 3 illustrates, by way of example, a portion of the verification tree broken into three components, and an assembly.

FIG. 3 illustrates, by way of example, a portion of the verification tree 200 broken into three components 340, 342, 344, and an assembly 338. In the example of FIG. 3, the three components 340, 342, 344 are dies and the assembly 338 is a multi-die device or package. The individual verification trees 330, 332, 334, 336 represent subsets of the system level verification tree 200. Each of the individual verification trees 330, 332, 334, 336 can be used to help verify that the components 340, 342, 344 and the assembly 338 are the same as what was recorded in manufacturing, distribution, operation, or the like. The individual verification trees 330, 332, 334, 336 can be assembled into the system level verification tree 200 by hashing root nodes of the individual verification trees 330, 332, 334, 336 together to form another node of the system level verification tree 200.

Any of the verification trees 200, 330, 332, 334, 336 and corresponding challenges can be provided to a next entity in a supply chain. The verification trees 200, 330, 332, 334, 336 can be used to verify the authenticity of the component, assembly, system, or the like associated therewith. The verification trees can indicate when a component is incorrect, a system is tampered with, or the like. An entity that receives the challenges can regenerate the verification tree based on the challenges and verify whether the regenerated verification tree matches the verification tree 200, 330, 332, 334, 336 provided with the component, assembly, system, or the like.

FIG. 4 illustrates, by way of example, a diagram of an embodiment of a system 400 for command and control. The system 400 can leverage the hash of the response 114 (see FIG. 1) for secure communication between an operator device 440 device and corresponding tactical devices 442, 444, 446. The operator device 440 can encrypt a communication in a manner in which the communication can be decrypted using the hash of the response 114. The operator device 440 can broadcast the communication to multiple devices 442, 444, 446 along with the challenge 110. The devices 442, 444, 446 implement the challenge 110 on themselves to produce a response. The devices 442, 444, 446 can then hash their respective responses and attempt to decrypt the communication. The device 442, 444, 446 for which the communication is intended will generate the hash of the response 114 and be able to decrypt the communication. The device 442, 444, 446 for which the communication is not intended will not be able to generate the hash of the response 114 or decrypt the communication. The system 400 thus provides a cryptographic system for which keys do not need to be shared. Rather, in the system 400, the responses are inherent to the electronics of the devices 442, 444, 446 by way of strong PUFs.

To communicate with each of the devices 442, 444, 446, the operator 440 first enrolls each of the devices 442, 444, 446 and records their measured responses. Operator device 440 can, during operation/verification issue a challenge to each of the devices 442, 444, 446 and simultaneously use the enrolled data to pre-calculate the expected key that each device will generate. Therefore the operator 440 can establish encrypted communication to each device 442, 444, 446. The operator device 440 would then have three unique keys, one for each device. The operator device 440 can include communications circuitry, such as a transmitter, receiver, or transceiver configured to generate the communications to the devices 442, 444, 446 or receive communications from the devices 442, 444, 446.

Figure 5:
FIG. 5 illustrates, by way of example, a diagram of an embodiment of a block chain enrollment record for a component, assembly, system, device, or other electric or electronic device.

FIG. 5 illustrates, by way of example, a diagram of an embodiment of a block chain enrollment record 500 for a component, assembly, system, device, or other electric or electronic device. The record 500 includes sequential blocks 550, 552. Each of the sequential blocks 550, 552 records challenge and hashed response data for a given electric or electronic device in block data 556. The challenge and hashed response data can be stored in the block data 556. The block data 556 can include verification trees with the challenge and hashed response pairs. The block data 556 can be encrypted with a key that is a hashed response value. This makes it so that only an entity in possession of a genuine device can navigate the block chain.

Each of the sequential blocks 550, 552 also includes a block header 554. The block header 554 can be used to verify that the enrollment record has not been altered. A hash of a previous block header 558 can be used to verify that the block is not altered. For example, the hash of the previous block header in the block 552 can be used to verify the information in the block 550. A timestamp 560 indicates a time at which the block was added to the blockchain. A nonce 562 can be used to help indicate that an entity accessing the block chain is not malicious, such as by preventing block replay. A hash of block data 564 indicates a value stored in a root node (sometimes called a root key value) of a verification tree for the device associated with the block data 556. In FIG. 2, each of the nodes above the first level of nodes (the first level of nodes are the nodes labeled H(1,X) where X is an integer). Thus, each of the nodes H(Y,X), where Y>1 are root nodes. If the block data 556 corresponds to component 1, the hash of block data 564 can store the value of the node H(2,0).

FIG. 6 illustrates, by way of example, a flow diagram of an embodiment of a technique 600 for securely performing system upgrades. The technique 600 as illustrated includes enrolling an electronic device in the system upgrade process, at operation 660. Enrolling the electronic device includes recording challenge and hash of response pairs for the electronic device in the block chain record 500 (see FIG. 5), for example. The challenge and response pairs act as cryptographic keys for the electronic device.

The technique 600 as illustrated includes authenticating the electronic device at operation 662. Authenticating can include decrypting a payload using hashed responses (or hashes of combinations of the hashed responses, etc.). The payload is verified if it is accurately decrypted.

At operation 664, the payload can be deployed on the electronic device to update the electronic device.

Upgrading or updating a component can result in branching of the block chain 500 (see FIG. 5). The replacement/ upgraded/updated component can be legitimate, however it would have a different response than the original device, hence creating a new block in the block chain and therefore branching from the baseline. Note that changing out a component can alter a response of a challenge and response pair. The electronic device can encrypt a communication that indicates changes to a response of a challenge and response pair using a same or similar key as was used to encrypt the payload. Then the communication can be decrypted by an enrollment manager. The enrollment manager can then update the response value associated with the challenge responsive to verifying the communication.

Figure 7:
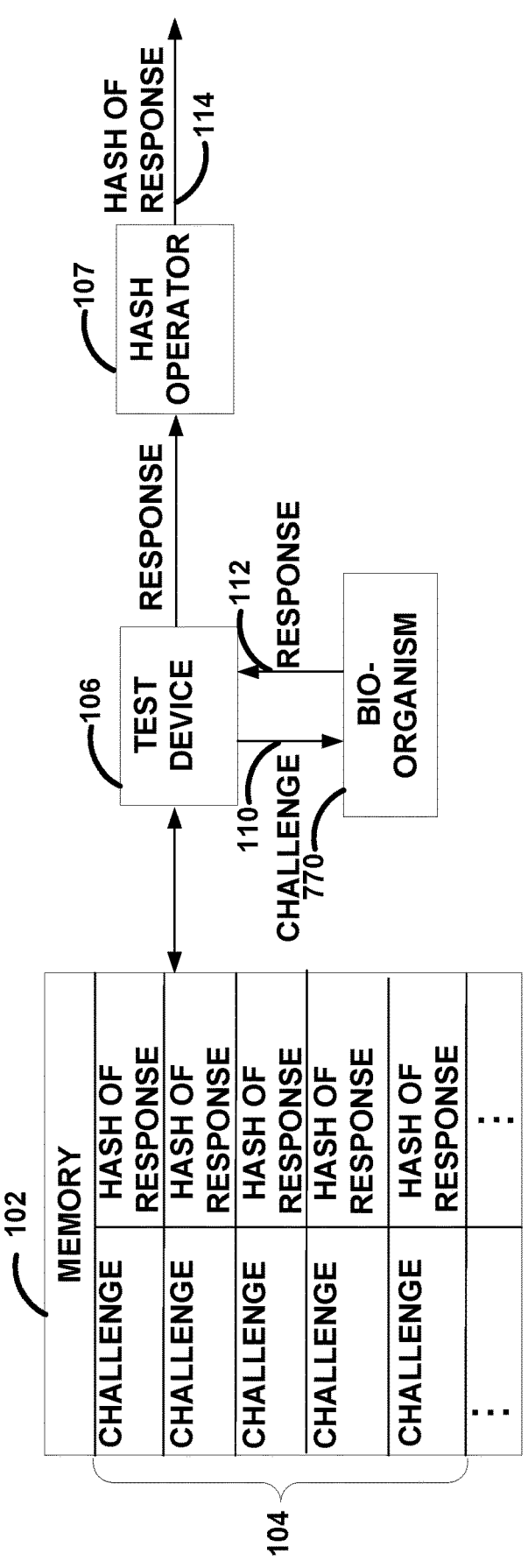
FIG. 7 illustrates, by way of example, a diagram of an embodiment of system for generating a hash of a response for a bio-organism.

FIG. 7 illustrates, by way of example, a diagram of an embodiment of system 700 for generating a hash of a response 114 for a bio-organism 770. The system 700 is similar to the system 100 of FIG. 1 with the system 700 including a bio-organism 770 in place of the DUT 108. Similar to the system 100, the hash of the response 114 from the bio-organism 770 can be used as a cryptographic verification.

The system 700 can enroll the bio-organism 770 by collecting specific individual bio features, such as eye retina scan, fingerprint scan, voice scan, or the like. The strong PUF concept can be applied to the bio-organism 770 by providing bio-organism with stimulus (challenge) and collect the responses to the stimulus. An example of stimulus includes a picture. The response to the stimulus can be collected. A combination of individual bio features and stimulus responses can be used to authenticate the bio-organism 770 in a manner similar to that used to authenticate the DUT 108 (see FIG. 1).

The bio-organism 770 is an animal, plant, fungi, protist, bacteria, archaea, or the like. The system 800 includes challenge and hashed response pairs 104. A challenge 110 for the bio-organism 770 can be selected or retrieved, such as randomly or strategically, by the test device 106. The challenge 110 is an electrical, optical, chemical, mechanical or other stimulus to be applied to the bio-organism so as to elicit a response 112. The response 112 is a characteristic reaction of the bio-organism 770 and only the bio-organism 770. The response 112 is globally unique to the bio-organism 770 due to growth variation/preference/bias. The challenge 110 is the PUF and the response 112 is the output of the PUF. The response 112 is hashed, by a hash operator 107, to generate the hash of the response 114. The hash of the response 114 can be stored in the memory 102 and associated with the challenge 110. The hash of the response 114 is unique to the bio-organism 770 because the response 112 is unique to the bio-organism 770. The hash of the response 114 can be used to verify the identity of the bio-organism 770, determine whether the bio-organism 770 has been tampered with, determine whether the bio-organism 770 has degraded is otherwise defective or damaged, encrypt or decrypt a communication, or the like. The hash of the response 114 can be chained together in a tree of hashes of the responses associated with the bio-organism 770 so as to verify that the bio-organism 770 is as expected.

Example challenges 110 in the example of verifying a human bio-organism an image presentation, a sound presentation, or the like while performing a retina scan, recording voice, or the like. Another example challenge is a fingerprint. The hashed responses 114, similar to what can be performed with the DUT 108 (see FIG. 1) can form a verification tree. Only the bio-organism 770 that enrolled to generate the tree will be able to verify and attest that they are the bio-organism 770.

FIG. 8 illustrates, by way of example, a diagram of an embodiment of a method 800 for securing a supply chain of a component, assembly, system, or the like that includes strong PUFs. The method 800 as illustrated includes identifying (i) respective challenges indicating respective stimuli and (ii) a root node hash value, at operation 880; generating the respective stimuli, at operation 882; recording respective responses to the respective electrical stimuli, at operation 884; hashing the respective responses resulting in respective hashed responses, at operation 886; hashing a combination of hashed responses of the respective hashed responses resulting in a key, at operation 888; and comparing the key to the root node hash value, at operation 890.

The respective challenges, and the root node hash value can be stored in a blockchain. A block of the blockchain can include the root node hash value stored in a header. The block of the blockchain can include the respective challenges and hashes of the respective responses in block data. The block data can be encrypted using a respective hashed response of the hashed responses.

The method 800 can further include issuing a communication with a payload encrypted based on the root node hash value. The communication can be broadcast. The communication can further include the respective challenges. The method 800 can further include identifying that the electronic device is not authentic based on determining the root node hash value does not match the key.

Figure 9:
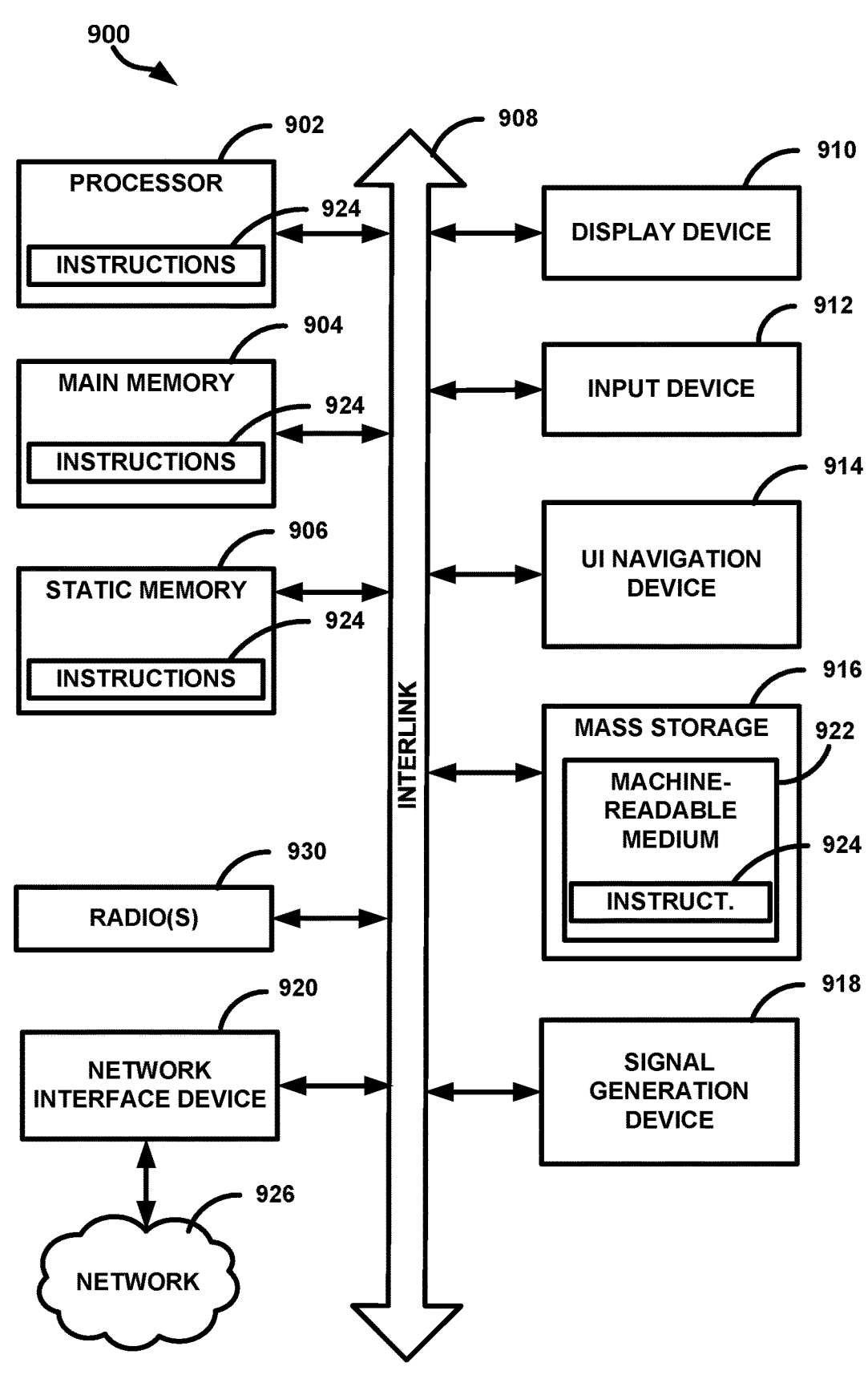
FIG. 9 illustrates, by way of example, a block diagram of an embodiment of a machine on which one or more of the methods as discussed herein can be implemented.

FIG. 9 illustrates, by way of example, a block diagram of an embodiment of a machine 900 on which one or more of the methods as discussed herein can be implemented. The machine 900 can include a computing device instantiated as a compute device or server. One or more of the memory 102, test device 106, DUT 108, hash operator 107, component 340, 342, 344, assembly 338, operator device 440, device 442, 444, 446, technique 600, system 700, method 800, or the like can include or be implemented using one or more of the items of the machine 900. In alternative embodiments, the machine 900 operates as a standalone device or may be connected (e.g., networked) to other machines. In a networked deployment, the machine 900 may operate in the capacity to monitor multiple components and circuits and may operate as a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 900 includes a processor 902 (e.g., a central processing unit (CPU), a graphics processing unit (GPU) or both), a main memory 904 and a static memory 906, which communicate with each other via a bus 908. The machine 900 may further include a video display unit 910 (e.g., a liquid crystal display (LCD), light emitting diode (LED), a cathode ray tube (CRT), or the like). The machine 900 may include an alphanumeric input device 912 (e.g., a keyboard), a user interface (UI) navigation device 914 (e.g., a mouse), a disk drive unit 916, a signal generation device 918 and a network interface device 920.

The memory 904, 906, 916 are examples of a storage device that can include instructions stored thereon that are executed by a machine, such as a processor or other processing circuitry, and can cause the machine to perform operations. The instructions and other information can be encrypted or otherwise protected by one or more security measures, such as to help protect the operational boundaries and other data stored thereon.

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that can cause the machine to perform any one or more of the methodologies of the present disclosure, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Examples and Additional Notes

Example 1 includes a method for validating an identity of an electronic device or a bio-organism, the method comprising identifying (i) respective challenges indicating respective stimuli and (ii) a root node hash value, generating the respective stimuli, recording respective responses to the respective electrical stimuli, hashing the respective responses resulting in respective hashed responses, hashing a combination of hashed responses of the respective hashed responses resulting in a key, and comparing the key to the root node hash value.

In Example 2, Example 1 further includes, wherein the respective challenges, and the root node hash value are stored in a blockchain.

In Example 3, Example 2 further includes, wherein a block of the blockchain includes the root node hash value stored in a header.

In Example 4, Example 3 further includes, wherein the block of the blockchain includes the respective challenges and hashes of the respective responses in block data.

In Example 5, Example 4 further includes, wherein the block data is encrypted using a respective hashed response of the hashed responses.

In Example 6, at least one of Examples 1-5 further includes issuing a communication with a payload encrypted based on the root node hash value.

In Example 7, Example 6 further includes, wherein the communication is broadcast and further includes the respective challenges.

In Example 8, at least one of Examples 1-7 further includes identifying that the electronic device is not authentic based on determining the root node hash value does not match the key.

Example 9 includes a system for validating an identity of an electronic device or bio-organism, the system configured to implement the method of one of Examples 1-8.

Example 10 includes a non-transitory machine-readable medium including instructions that, when executed by a machine, configure the machine to perform the method for validating an identity of an electronic device or a bio-organism of one of Examples 1-8.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Therefore, this disclosure is not to be taken in a limiting sense, and the scope of various embodiments is defined only by the appended claims, along with the full range of equivalents to which such claims are entitled.

What is claimed is:

1. A method for validating an identity of an electronic device or a bio-organism, the method comprising:
   identifying (i) respective challenges indicating respective electrical stimuli to provide to respective components of the electronic device or bio-organism and (ii) a pre-computed root node hash value determined based on providing the electrical stimuli to the electronic device or the bio-organism previously;
   generating the respective electrical stimuli incident on the respective components of the electronic device or bio-organism;
   recording respective electrical responses elicited by the components of the electronic device or the bio-organism responsive to the respective electrical stimuli;
   hashing the respective electrical responses resulting in respective hashed responses;
   combining respective hashed responses associated with components of a same assembly resulting in combinations of hashed responses;
   hashing the combinations of hashed responses resulting in assembly hashes;
   combining the assembly hashes resulting in a system hash;
   hashing the system hash resulting in a key; and
   validating the identity of the electronic device or the bio-organism by comparing the key to the root node hash value.

2. The method of claim 1, wherein the respective challenges, and the root node hash value are stored in a blockchain.

3. The method of claim 2, wherein a block of the blockchain includes the root node hash value stored in a header.

4. The method of claim 3, wherein the block of the blockchain includes the respective challenges and hashes of the respective responses in block data.

5. The method of claim 4, wherein the block data is encrypted using a respective hashed response of the hashed responses.

6. The method of claim 1, further comprising issuing a communication with a payload encrypted based on the root node hash value.

7. The method of claim 6, wherein the communication is broadcast and further includes the respective challenges.

8. The method of claim 1, further comprising identifying that the electronic device is not authentic based on determining the root node hash value does not match the key.

9. A system for validating an identity of an electronic device or bio-organism, the system comprising:

a test device configured to:

identify (i) respective challenges indicating respective electrical stimuli to provide to respective components of the electronic device or bio-organism and (ii) a pre-computed root node hash value determined based on providing the electrical stimuli to the electronic device or the bio-organism previously;

generate the respective electrical stimuli incident on the respective components of the electronic device or bio-organism; and record respective electrical responses elicited by the components of the electronic device or the bio-organism responsive to the respective electrical stimuli; and a hash operator configured to:

hash the respective electrical responses resulting in respective hashed responses;

combine respective hashed responses associated with components of a same assembly resulting in combinations of hashed responses;

hash the combinations of hashed responses resulting in assembly hashes;

combine the assembly hashes resulting in a system hash; and hash the system hash resulting in a key; and the test device is further configured to validate the identity of the electronic device or the bio-organism by comparing the key to the root node hash value.

10. The system of claim 9, wherein the respective challenges, and the root node hash value are stored in a blockchain.

11. The system of claim 10, wherein a block of the blockchain includes the root node hash value stored in a header.

12. The system of claim 11, wherein the block of the blockchain includes the respective challenges and hashes of the respective responses in block data.

13. The system of claim 12, wherein the block data is encrypted using a respective hashed response of the hashed responses.

14. The system of claim 9, further comprising communications circuitry configured to issue a communication with a payload encrypted based on the root node hash value.

15. The system of claim 14, wherein the communication is broadcast and further includes the respective challenges.

16. The system of claim 9, further comprising identifying that the electronic device is not authentic based on determining the root node hash value does not match the key.

17. A non-transitory machine-readable medium including instructions that, when executed by a machine, configure the machine to perform operations for validating an identity of an electronic device or a bio-organism, the operations comprising:

identifying (i) respective challenges indicating respective electrical stimuli to provide to respective components of the electronic device or bio-organism and (ii) a pre-computed root node hash value determined based on providing the electrical stimuli to the electronic device or the bio-organism previously;

generating the respective electrical stimuli incident on the respective components of the electronic device or bio-organism;

recording respective electrical responses elicited by the components of the electronic device or the bio-organism responsive to the respective electrical stimuli;

hashing the respective electrical responses resulting in respective hashed responses;

combining respective hashed responses associated with components of a same assembly resulting in combinations of hashed responses;

hashing the combinations of hashed responses resulting in assembly hashes;

combining the assembly hashes resulting in a system hash;

hashing the system hash resulting in a key; and validating the identity of the electronic device or the bio-organism by comparing the key to the root node hash value.

18. The non-transitory machine-readable medium of claim 17, wherein the respective challenges, and the root node hash value are stored in a blockchain.

19. The non-transitory machine-readable medium of claim 18, wherein a block of the blockchain includes the root node hash value stored in a header.

20. The non-transitory machine-readable medium of claim 19, wherein the block of the blockchain includes the respective challenges and hashes of the respective responses in block data.

* * * * *